United States Patent
Lu et al.

(10) Patent No.: US 10,502,601 B2
(45) Date of Patent: Dec. 10, 2019

(54) DETECTION OF FLOW RATE OVER DYNAMIC RANGE

(71) Applicant: Expro Meters, Inc., Wallingford, CT (US)

(72) Inventors: Minfu Lu, Wallingford, CT (US); Michael Sapack, Southbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 517 days.

(21) Appl. No.: 15/402,533

(22) Filed: Jan. 10, 2017

(65) Prior Publication Data

US 2018/0195888 A1 Jul. 12, 2018

(51) Int. Cl.
| | | |
|---|---|---|
| *G01F 1/66* | (2006.01) | |
| *G01F 15/02* | (2006.01) | |
| *G01F 1/74* | (2006.01) | |
| *G01F 1/708* | (2006.01) | |
| *G01F 7/00* | (2006.01) | |

(52) U.S. Cl.
CPC ............... *G01F 1/667* (2013.01); *G01F 1/66* (2013.01); *G01F 1/7082* (2013.01); *G01F 1/74* (2013.01); *G01F 7/00* (2013.01); *G01F 15/028* (2013.01)

(58) Field of Classification Search
USPC ......................................................... 702/48
See application file for complete search history.

(56) References Cited

U.S. PATENT DOCUMENTS

| | | | |
|---|---|---|---|
| 3,948,097 A * | 4/1976 | Kurita | G01F 1/3218 73/861.22 |
| 4,430,722 A | 2/1984 | Massen et al. | |
| 7,121,152 B2 | 10/2006 | Winston | |
| 8,452,551 B2 | 5/2013 | Gysling | |
| 2002/0194932 A1 | 12/2002 | Gysling et al. | |
| 2007/0044572 A1 | 3/2007 | Davis et al. | |
| 2008/0105839 A1* | 5/2008 | Jennings | F16K 7/07 251/61.1 |
| 2014/0102697 A1 | 4/2014 | Dragnea | |
| 2014/0257269 A1* | 9/2014 | Woloszko | A61B 18/148 606/34 |
| 2017/0276527 A1* | 9/2017 | Chen | G01F 1/6847 |

OTHER PUBLICATIONS

International search report for PCT/US2018/013086 dated Mar. 26, 2018.

* cited by examiner

*Primary Examiner* — Paul D Lee (74) *Attorney, Agent, or Firm* — O'Shea Getz P.C.

(57) ABSTRACT

Aspects of the disclosure are directed to a obtaining a first plurality of signals associated with a fluid flow in a pipe, processing, by a processor, the first plurality of signals to obtain a first plot of power associated with first vortices in the fluid flow and a flow rate of the fluid flow in the pipe over a first flow rate range, determining, by the processor, that a maximum value of the power in the first plot corresponds to a maximum value of the flow rate included in the first flow rate range or that the power is increasing as a function of the flow rate towards an end of the first plot, and based on said determining, multiplying, by the processor, values of the first flow rate range to obtain a second flow rate range.

17 Claims, 9 Drawing Sheets

DETECTION OF FLOW RATE OVER DYNAMIC RANGE

BACKGROUND

Figure 1:
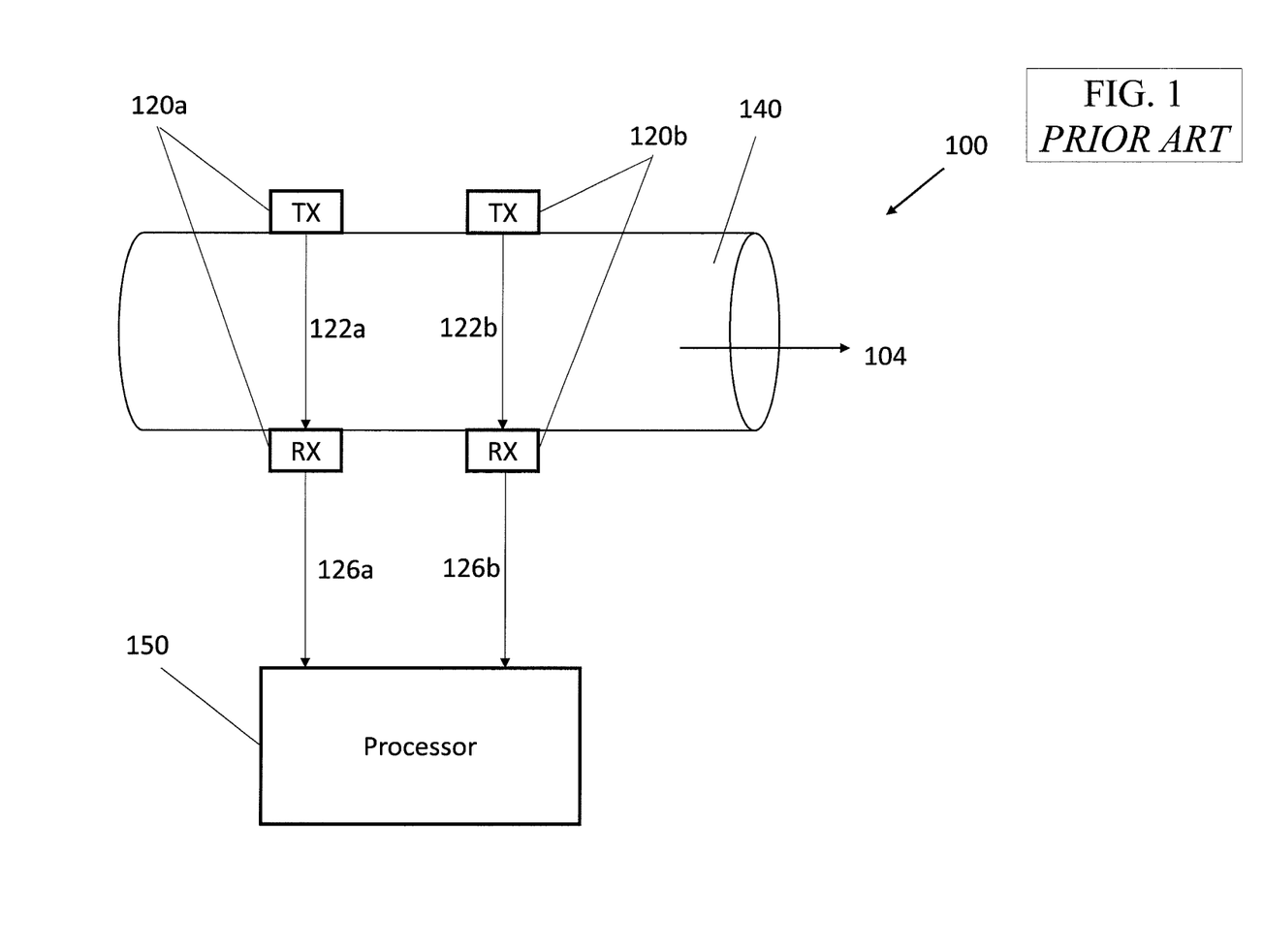
FIG. 1 is a prior art flowmeter system for measuring a fluid flow.

In the oil and gas industry, the ability to accurately measure one or more characteristics associated with a fluid flow is desirable. For example, flowmeters are used to detect the rate/velocity of a fluid flow within a pipe/conduit. Referring to FIG. 1, a prior art system 100 for measuring a fluid flow 104 is shown. The system 100 includes an active SONAR-type flowmeter that includes a spatial array of at least two sensors (e.g., sensors 120a and 120b) disposed at different axial positions along a pipe 140. Each of the sensors 120a/120b includes a transmitter (TX) that transmits a respective signal 122a/122b through/across the pipe 140 and a receiver (RX) that provides a respective signal 126a/126b indicative of a characteristic of the flow 104 passing through the pipe 140. The signals 126a and 126b from the sensors 120a and 120b (e.g., from the respective receivers RX) are sent to a processor 150 where they are processed to determine the rate of the flow 104 passing within the pipe 140. A time domain to frequency domain transformation/translation, such as for example a Fourier-based transform (e.g., a Fast Fourier Transform [FFT]), is frequently implemented by the processor 150 in determining the rate of the flow 104 passing through the pipe 140.

In some instances, flowmeters are incapable of detecting flow rates. When the flow rate of a flow is too low (e.g., less than a threshold), high frequency bins associated with the FFT contain so much noise that the energy of the low frequency bins is overwhelmed. Additionally, when the flow rate of the flow is too high (e.g., greater than a threshold), low frequency bins associated with the FFT, which contain the actual low flow velocity energy, are omitted in the flow rate calculation by the processor 150. Under one or both of these circumstances, the flowmeter may fail to report a flow rate and/or the reported flow rate may be invalid/inaccurate.

In order to address the foregoing, a technician/operator of the flowmeter has to initialize the flowmeter with configuration parameters based on assumptions regarding the flow rate. For example, an assumption is made regarding whether the flow rate is generally high (e.g., greater than a threshold) or generally low (e.g., less than a threshold), and associated configuration parameters are selected for the flowmeter based on that assumption. The flowmeter uses these configuration parameters to provide for a proper initialization in terms of detecting the flow rate of the flow.

While the approach described above enables measurement of flows that are relatively constant (e.g., within a specified range of flow rates), there could be a failure/gap in terms of flow rate measurement if the flow rate is dynamic in nature. Moreover, the approach described above requires a high level of technician training/experience in order to properly operate the flowmeter. Accordingly, what is needed is a simplified approach to measuring flow rates, inclusive of flow rates that vary over a wide range in a dynamic manner/fashion.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method comprising: obtaining a first plurality of signals associated with a fluid flow in a pipe, processing, by a processor, the first plurality of signals to obtain a first plot of power associated with first vortices in the fluid flow and a flow rate of the fluid flow in the pipe over a first flow rate range, determining, by the processor, that a maximum value of the power in the first plot corresponds to a maximum value of the flow rate included in the first flow rate range or that the power is increasing as a function of the flow rate towards an end of the first plot, and based on said determining, multiplying, by the processor, values of the first flow rate range to obtain a second flow rate range. In some embodiments, multiplying values of the first flow rate range corresponds to doubling the values of the first flow rate range to obtain the second flow rate range. In some embodiments, the method further comprises processing, by the processor, a second plurality of signals to obtain a second plot of power associated with second vortices in the fluid flow and the flow rate of the fluid flow in the pipe over the second flow rate range. In some embodiments, the method further comprises determining, by the processor, an actual flow rate of the fluid flow based on the second plot, and outputting, by an output device, the actual flow rate. In some embodiments, the actual flow rate of the fluid flow corresponds to a maximum value of the power in the second plot. In some embodiments, the method further comprises obtaining a second plurality of signals associated with the fluid flow in the pipe, and processing, by the processor, the second plurality of signals to obtain a second plot of power associated with second vortices in the fluid flow and a flow rate of the fluid flow in the pipe over a third flow rate range. In some embodiments, the method further comprises determining that a minimum value included in the third flow rate range is less than a threshold, and based on determining that the minimum value included in the third flow rate range is less than the threshold, multiplying, by the processor, values of the third flow rate range to obtain a fourth flow rate range. In some embodiments, the method further comprises determining, by the processor, that a maximum value of the power in the second plot corresponds to a flow rate that is greater than a fraction of the third flow rate range, and based on determining that the maximum value of the power in the second plot corresponds to the flow rate that is greater than the fraction of the third flow rate range, multiplying, by the processor, values of the third flow rate range to obtain a fourth flow rate range. In some embodiments, the determining that the maximum value of the power in the second plot corresponds to the flow rate that is greater than the fraction of the third flow rate range includes determining that the maximum value of the power in the second plot corresponds to a flow rate that is greater than half the third flow rate range. In some embodiments, multiplying values of the third flow rate range corresponds to doubling the values of the third flow rate range to obtain the fourth flow rate range. In some embodiments, the method further comprises determining, by the processor, that a maximum value of the power in the second plot corresponds to a flow rate that is less than a fraction of the third flow rate range, and based on determining that the maximum value of the power in the second plot corresponds to the flow rate that is less than the fraction of the third flow rate range, dividing, by the processor, values of the third flow rate range to obtain a fourth flow rate range. In some embodiments, the determining that the maximum value of the power in the second plot corresponds to the flow rate that is less than the fraction of the third flow rate range includes determining that the maximum value of the power in the second plot corresponds to a flow rate that is less than one-quarter of the third flow rate range. In some embodiments, dividing values of the third flow rate range corresponds to halving the values of the third flow rate range to obtain the fourth flow rate range.

Aspects of the disclosure are directed to a system comprising: a processor, and a non-transitory storage device having instructions stored thereon that, when executed by the processor, cause the system to: obtain a first plurality of signals associated with a fluid flow in a pipe, process the first plurality of signals to obtain a first plot of power associated with first vortices in the fluid flow and a flow rate of the fluid flow in the pipe over a first flow rate range, determine that a maximum value of the power in the first plot corresponds to a maximum value of the flow rate included in the first flow rate range or that the power is increasing as a function of the flow rate towards an end of the first plot, based on said determination, multiply values of the first flow rate range to obtain a second flow rate range, obtain a second plurality of signals associated with the fluid flow in the pipe, process the second plurality of signals to obtain a second plot of power associated with second vortices in the fluid flow and the flow rate of the fluid flow in the pipe over the second flow rate range, determine an actual flow rate of the fluid flow based on a maximum value of the power in the second plot, and cause the actual flow rate to be output via an output device. In some embodiments, the non-transitory storage device includes at least one of a memory or a computer-readable medium, the system further comprising: the output device, the pipe, a first sensor positioned at a first axial location of the pipe, and a second sensor positioned at a second axial location of the pipe, where the first sensor provides a first of the first plurality of signals and the second sensor provides a second of the first plurality of signals. In some embodiments, the instructions, when executed by the processor, cause the system to: obtain a third plurality of signals associated with the fluid flow in the pipe, process the third plurality of signals to obtain a third plot of power associated with third vortices in the fluid flow and the flow rate of the fluid flow in the pipe over a third flow rate range, determine that a maximum value of the power in the third plot corresponds to a flow rate that is greater than half of the third flow rate range, based on determining that the maximum value of the power in the third plot corresponds to the flow rate that is greater than the fraction of the third flow rate range, double values of the third flow rate range to obtain a fourth flow rate range, and determine and output an actual flow rate based on the fourth flow rate range. In some embodiments, the instructions, when executed by the processor, cause the system to: obtain a third plurality of signals associated with the fluid flow in the pipe, process the third plurality of signals to obtain a third plot of power associated with third vortices in the fluid flow and the flow rate of the fluid flow in the pipe over a third flow rate range, determine that a maximum value of the power in the third plot corresponds to a flow rate that is less than a quarter of the third flow rate range, based on determining that the maximum value of the power in the third plot corresponds to the flow rate that is less than a quarter of the third flow rate range, half values of the third flow rate range to obtain a fourth flow rate range, and determine and output an actual flow rate based on the fourth flow rate range.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

In accordance with various aspects of the disclosure, apparatuses, systems, and methods are described for determining/detecting a fluid flow rate through, e.g., a pipe/conduit. In some embodiments, a flow range that is used may be adjusted/modified as part of the determination of flow rate.

Figure 2:
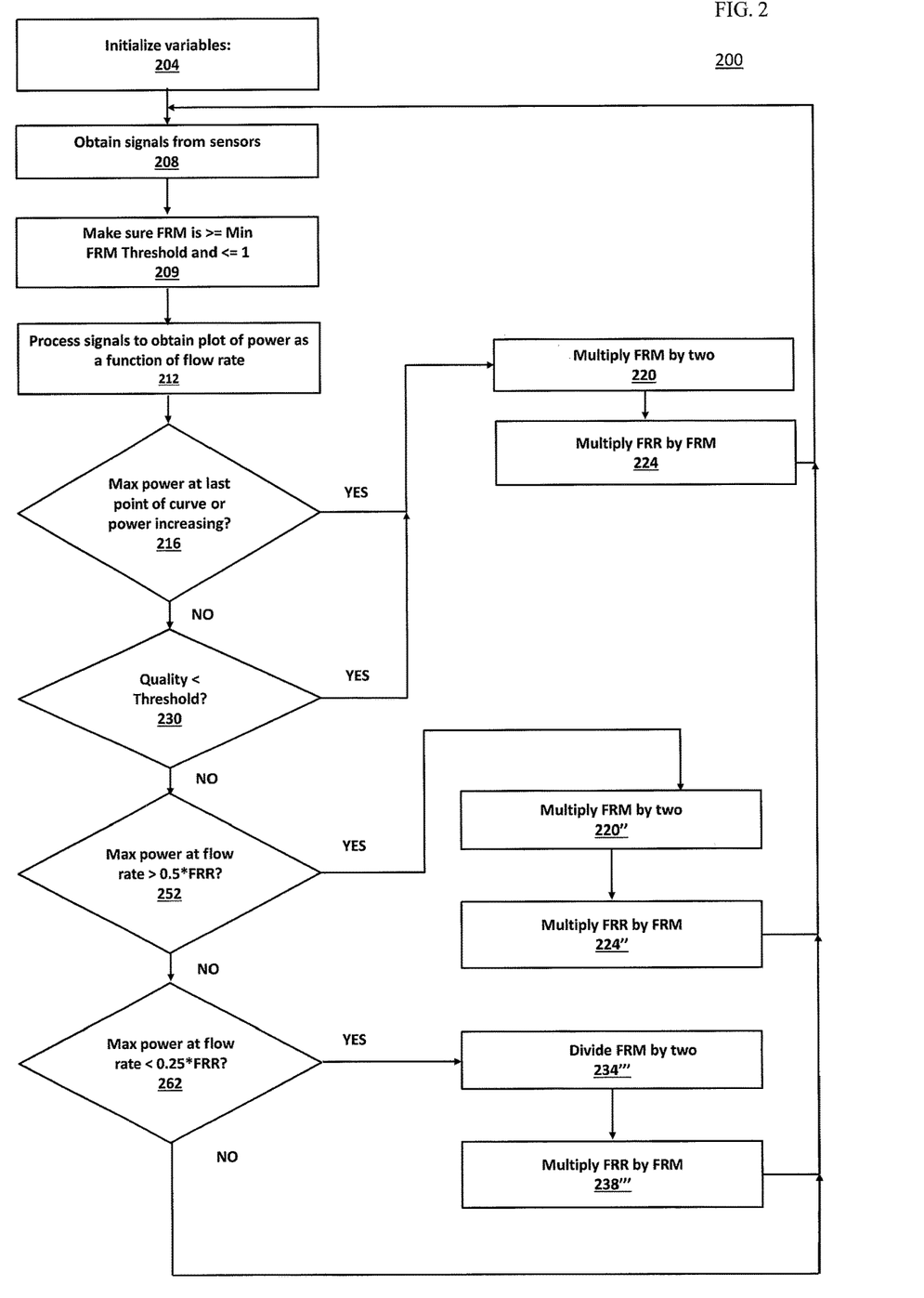
FIG. 2 illustrates a flow chart of an exemplary method for determining a flow rate in accordance with aspects of this disclosure.

Referring to FIG. 2, a flow chart of a method 200 for determining a flow rate in accordance with aspects of this disclosure is shown. The method 200 is described in relation to the system 100 of FIG. 1 for the sake of illustrative convenience, with the understanding that the method 200 may be adapted/modified to accommodate other types of systems/flowmeters.

In block 204 one or more variables associated with the method 200 may be initialized. For example, a first variable (illustratively referred to as a 'flow range multiplier' [FRM] variable) may be set equal to a minimum (Min) FRM Threshold value. A second variable associated with a 'flow rate range' [FRR] may be set equal to a(n initial) range of flow rates. Briefly referring to the plot shown in FIG. 3A, the second variable may have a value coinciding with a range of flow rates of 1 to 80 (where the flow rate may be expressed in one or more units, such as for example meters per second).

In block 208, signals (e.g., signals 126a/126b) may be obtained/received from one or more sensors (e.g., sensors 120a/120b). The signals may contain information regarding characteristics associated with a fluid flow rate.

In block 209, a determination may be made by, e.g., a processor (e.g., processor 402 of FIG. 4) whether the FRM is within a range of the Min FRM Threshold and 1. If outside the range, the FRM may be set to either the Min FRM Threshold or 1, depending on whether it is less than or greater than the range, respectively.

Figure 3A:
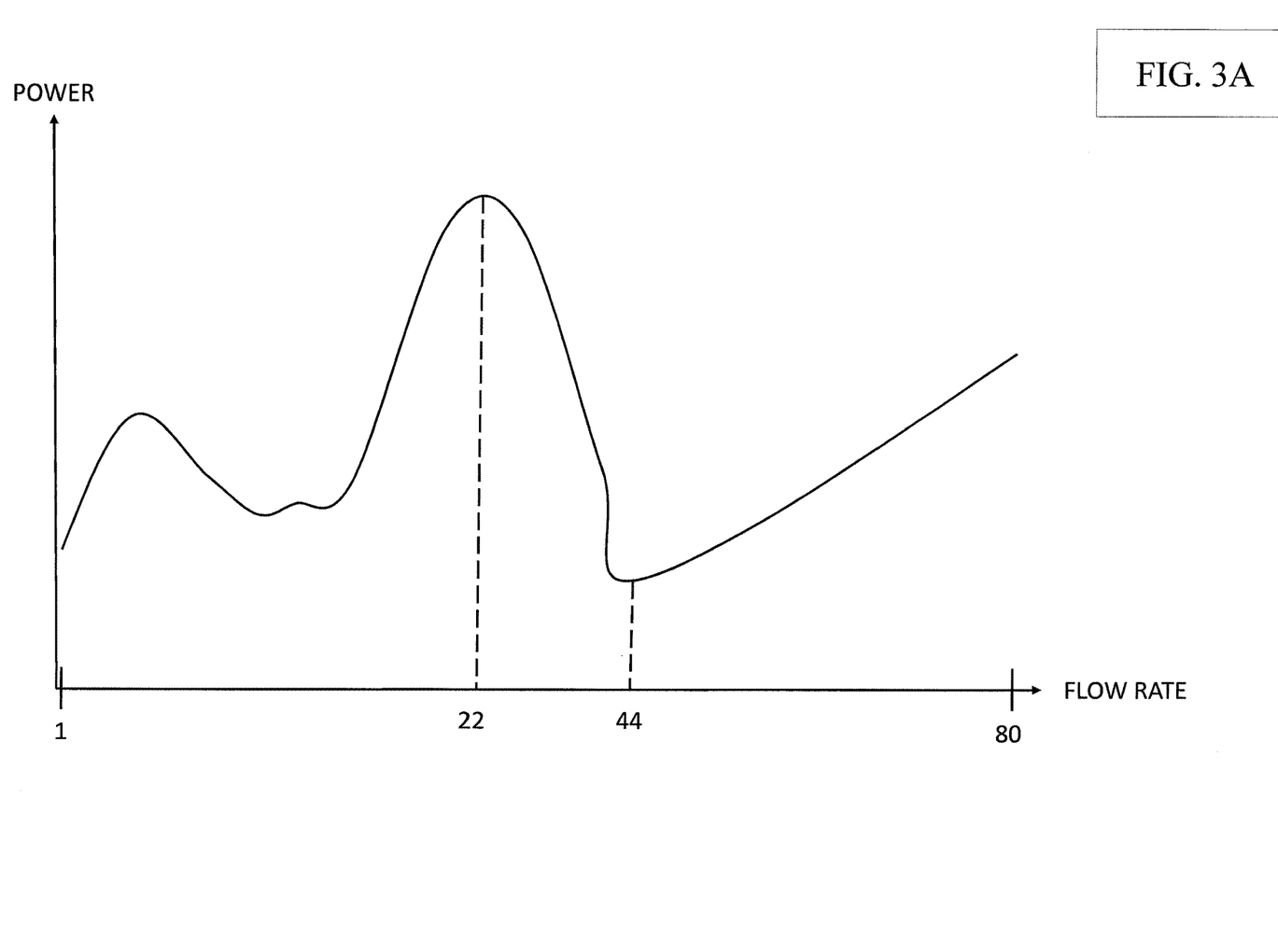
FIGS. 3A-3F illustrate plots of power versus flow rate in accordance with aspects of this disclosure.

In block 212, the signals of block 208 may be processed by, e.g., the processor to obtain a plot/relationship of power as a function of flow rate; FIG. 3A illustrates one example of such a plot with the power reflected on the vertical axis and the flow rate reflected on the horizontal axis. The processing of block 212 may include one or more algorithms as would be known to one of skill in the art. While expressed in terms of power, alternative expressions (e.g., energy) may be used. The power of the plot shown in FIG. 3A may correspond to the power associated with vortices in the fluid flow. The power may be expressed in terms of, e.g., amplitude and/or phase.

In block 216, a determination may be made whether at least one of the following conditions is satisfied: (1) the plot of block 212 has a maximum power value at the last point on the plot (e.g., at a flow rate of 80 in FIG. 3A), or (2) the power is increasing as a function of the flow rate towards the end (e.g., the right-most portion) of the plot corresponding to the maximum values of the flow rate in the FRR. Using the plot of FIG. 3A as an example, the maximum power value occurs at approximately a flow rate of 22 and the power is increasing (starting at a flow rate of 44) proximate/ towards 80. Thus, condition (2) described above is satisfied for the plot of FIG. 3A.

If the determination of block 216 is answered in the affirmative flow may proceed to block 220. Otherwise, flow may proceed to block 230.

In block 220, the first variable (e.g., the FRM variable) may be multiplied by two.

In block 224, the second variable (e.g., the FRR variable) may be multiplied by the first variable (e.g., the FRM variable), where the first variable has the value assumed in block 220.

Figure 3B:
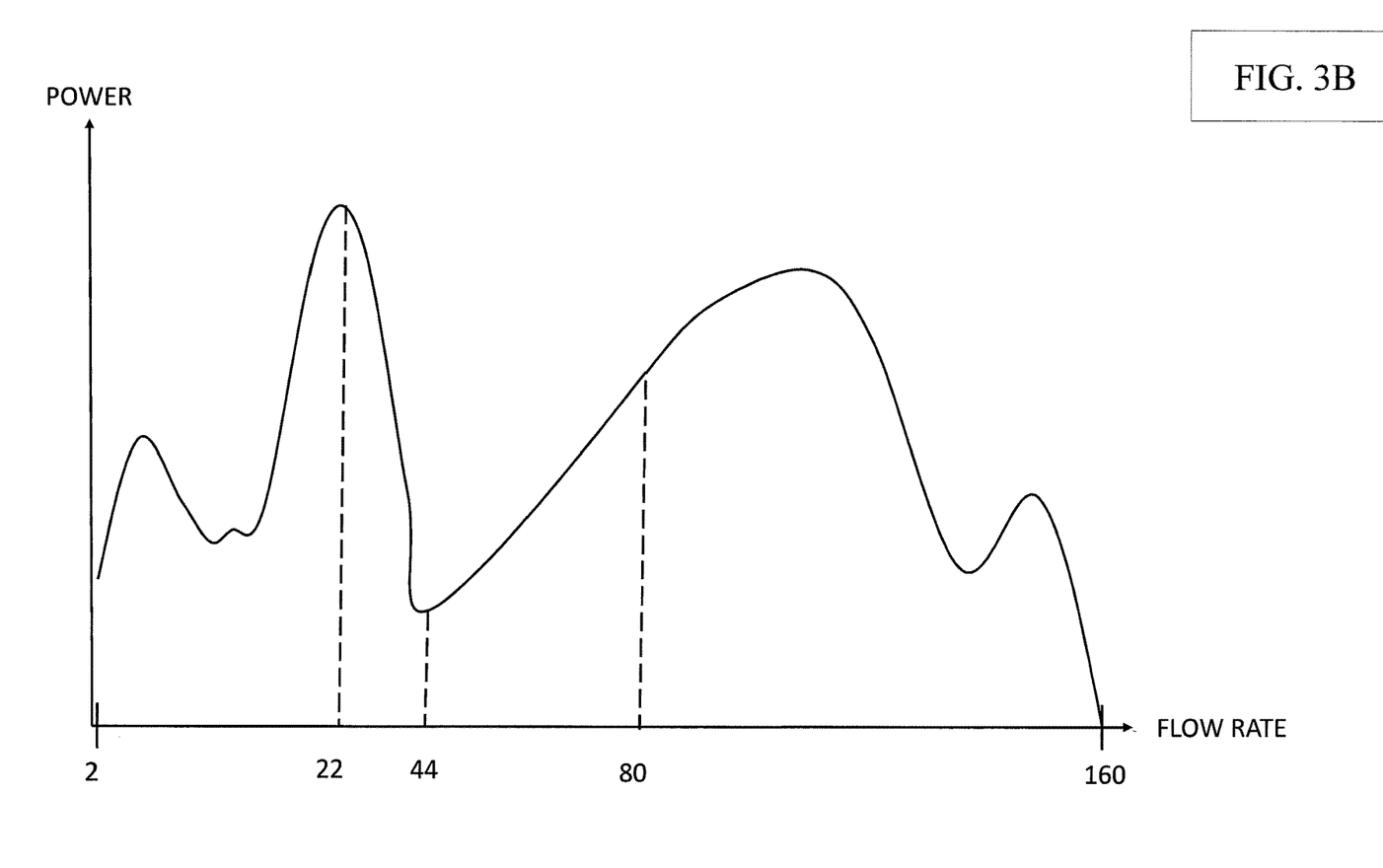

The result of the multiplications provided in relation to blocks 220 and 224 is seen in comparing the plots of FIGS. 3A and 3B. For example, the values for the FRR in FIG. 3B are shown as being doubled relative to the corresponding values for the FRR in FIG. 3A. From block 224, flow may proceed to block 208.

The loop established between, e.g., blocks 208, 209, 212, 216, 220, and 224 may be repeated so long as: (1) the test in block 216 continues to be answered in the affirmative, and (2) a specified/predetermined threshold (e.g., maximum threshold) for either the FRM or the FRR is not reached. This loop may enable the flowmeter to detect high value flow rates (e.g., flow rates that are greater than a maximum value included in the FRR as the FRR is selected at any given point in time). Once execution of this loop is complete, flow may proceed to block 230.

In block 230, a determination may be made whether a specified quality is less than a threshold. For example, as part of block 230, a determination may be made whether the minimum value included in the FRR variable is less than the threshold. If so, flow may proceed from block 230 to block 220; otherwise, flow may proceed from block 230 to block 252.

The threshold of block 230 may be based on one or more factors, such as for example the accuracy/quality of the flowmeter in terms of low flow rate measurement, the processing speed/capability of the flowmeter, etc.

Thus, as described above, a portion of the method 200 may be used to determine/detect flow rates that are greater than a maximum value included in the FRR variable at a given point in time. The determined/detected actual flow rate may correspond to the maximum value of the power on the respective plots of power versus flow rate; e.g., the flow rate may be equal to 22 in relation to FIGS. 3A-3B.

The portion of the method 200 described above may be used to determine/detect/lock-on to a flow rate in the first instance. The portion of the method 200 described below may be used to adjust the FRR on the basis of a change in the actual flow rate.

In block 252, a determination may be made whether the maximum power of the plot of block 212 corresponds to a flow rate value that is greater than half of the range of the FRR variable. For example, and referring to the plot of FIG. 3C, assuming a(n initial) FRR of 1 to 80 as shown the mid-point of that range is (1+80)/2=40.5. The maximum power is shown as occurring at a flow rate value of 60, which is greater than the mid-point value of 40.5. Accordingly, the determination of block 252 may be answered in the affirmative relative to the plot shown in FIG. 3C and flow may proceed from block 252 to block 220". Conversely, if the determination of block 252 is answered in the negative flow may proceed from block 252 to block 262.

In block 220", the FRM variable may be multiplied by two.

In block 224", the FRR variable may be multiplied by the FRM variable, where the FRM variable has the value assumed in block 220". From block 224", flow may proceed to block 208.

Figure 3C:
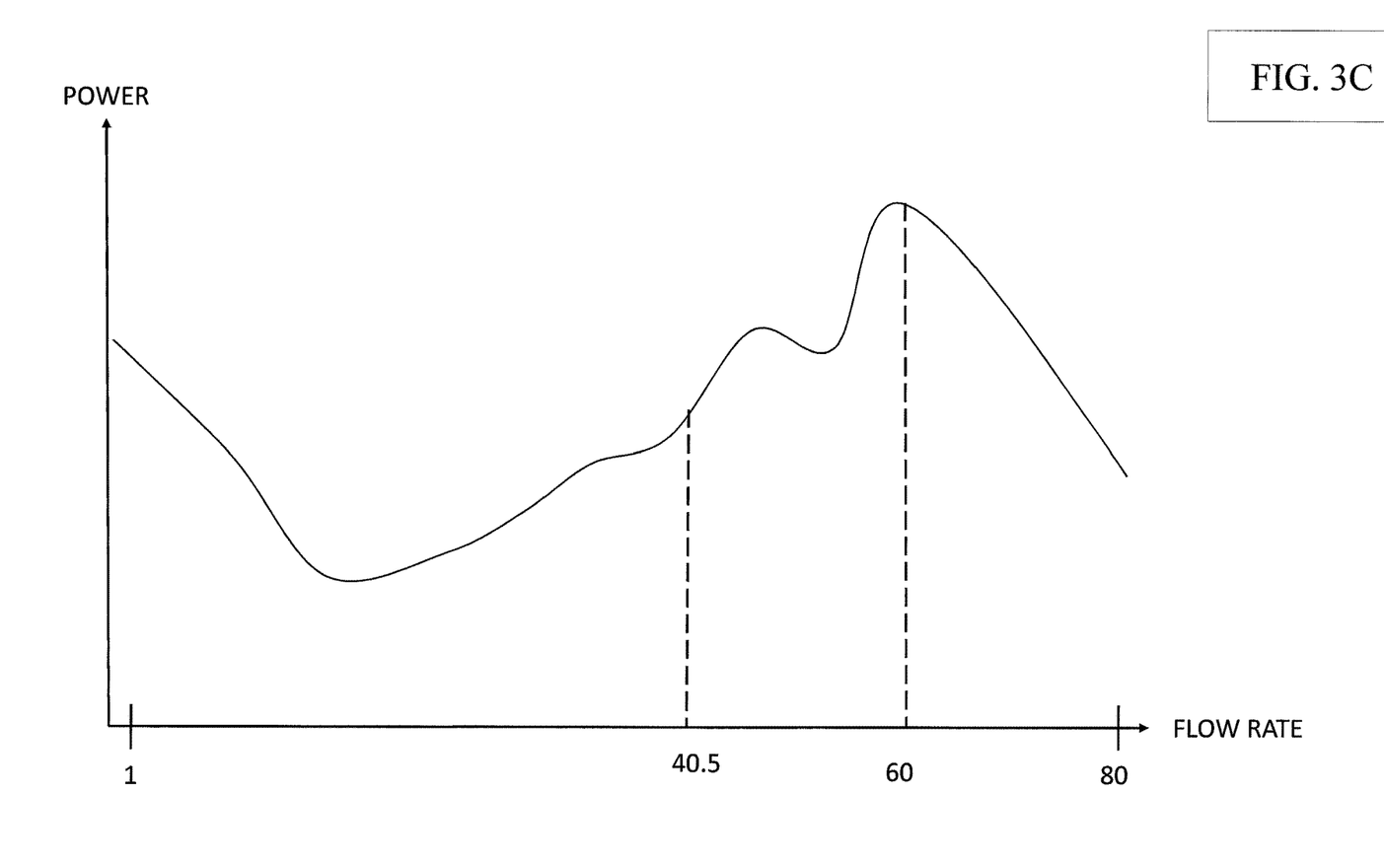
Figure 3D:
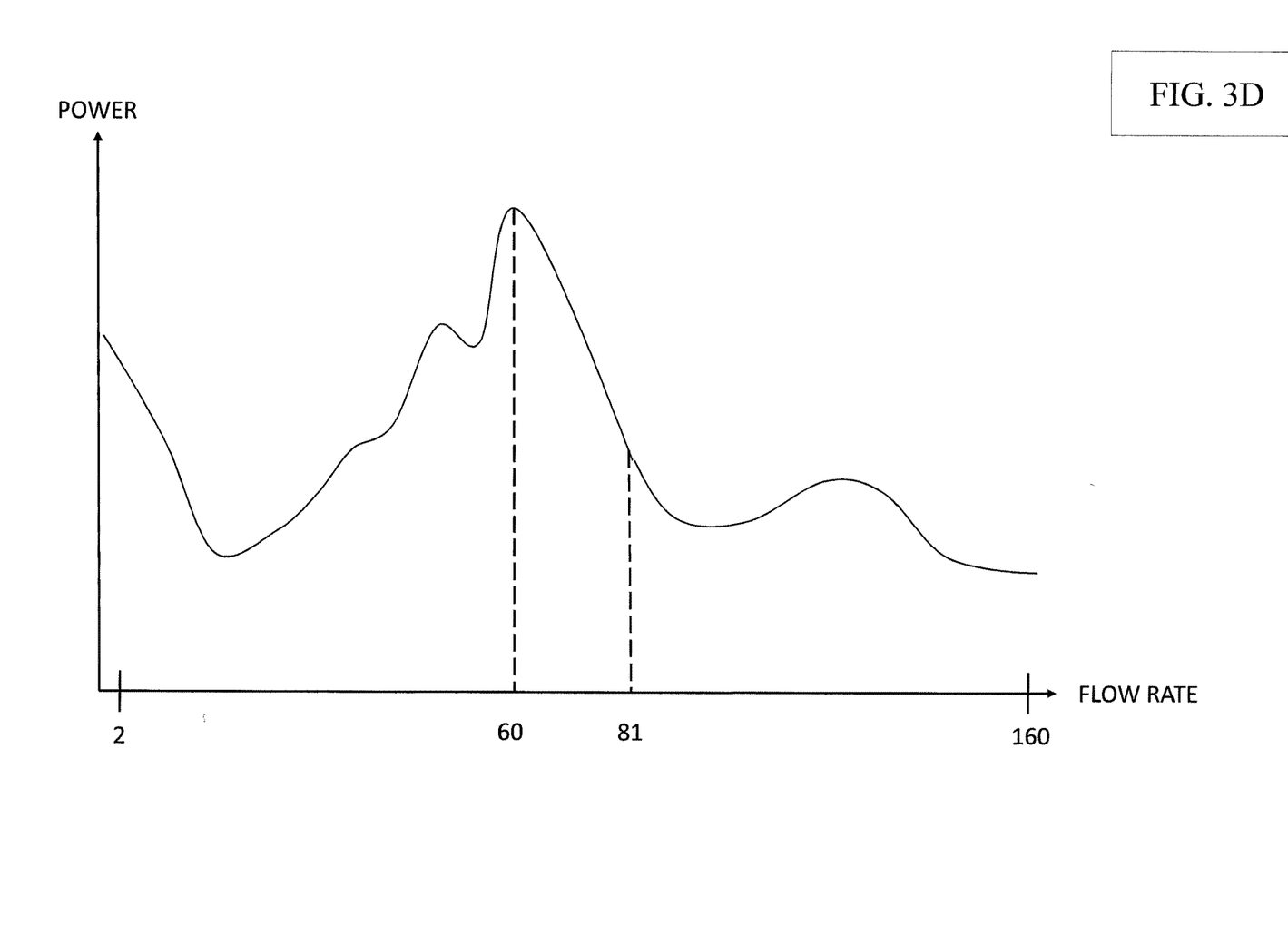

The result of the multiplications provided in relation to blocks 220" and 224" is shown in comparing the plots shown in FIGS. 3C and 3D. In particular, the values for the range of flow rates in FIG. 3D are shown as being doubled relative to the corresponding values for the range of flow rates in FIG. 3C. The maximum value of the power (corresponding to a flow rate value of 60) is to the left of the mid-point of the FRR (with a value of 81) in FIG. 3D.

While the blocks 220" and 224" are depicted separately from blocks 220 and 224, respectively, in some embodiments the blocks 220" and 224" may correspond to the blocks 220 and 224, respectively, which is to say that flow may proceed from block 252 to block 220 in some embodiments.

In block 262, a determination may be made whether the maximum power of the plot of block 212 corresponds to a flow rate value that is less than one-quarter of the range of the FRR variable. For example, and referring to the plot of FIG. 3E, assuming a(n initial) FRR of 1 to 80 as shown the one-quarter point of that range is (1+80)/4=20.25. The maximum power is shown as occurring at a flow rate value of 12, which is less than the one-quarter point value of 20.25. Accordingly, the determination of block 262 may be answered in the affirmative relative to the plot shown in FIG. 3E and flow may proceed from block 262 to block 234'''. Conversely, if the determination of block 262 is answered in the negative flow may proceed from block 262 to block 208.

In block 234''', the FRM variable may be divided by two.

In block 238''', the FRR variable may be multiplied by the FRM variable, where the FRM variable has the value assumed in block 234'''. From block 238''', flow may proceed to block 208.

Figure 3E:
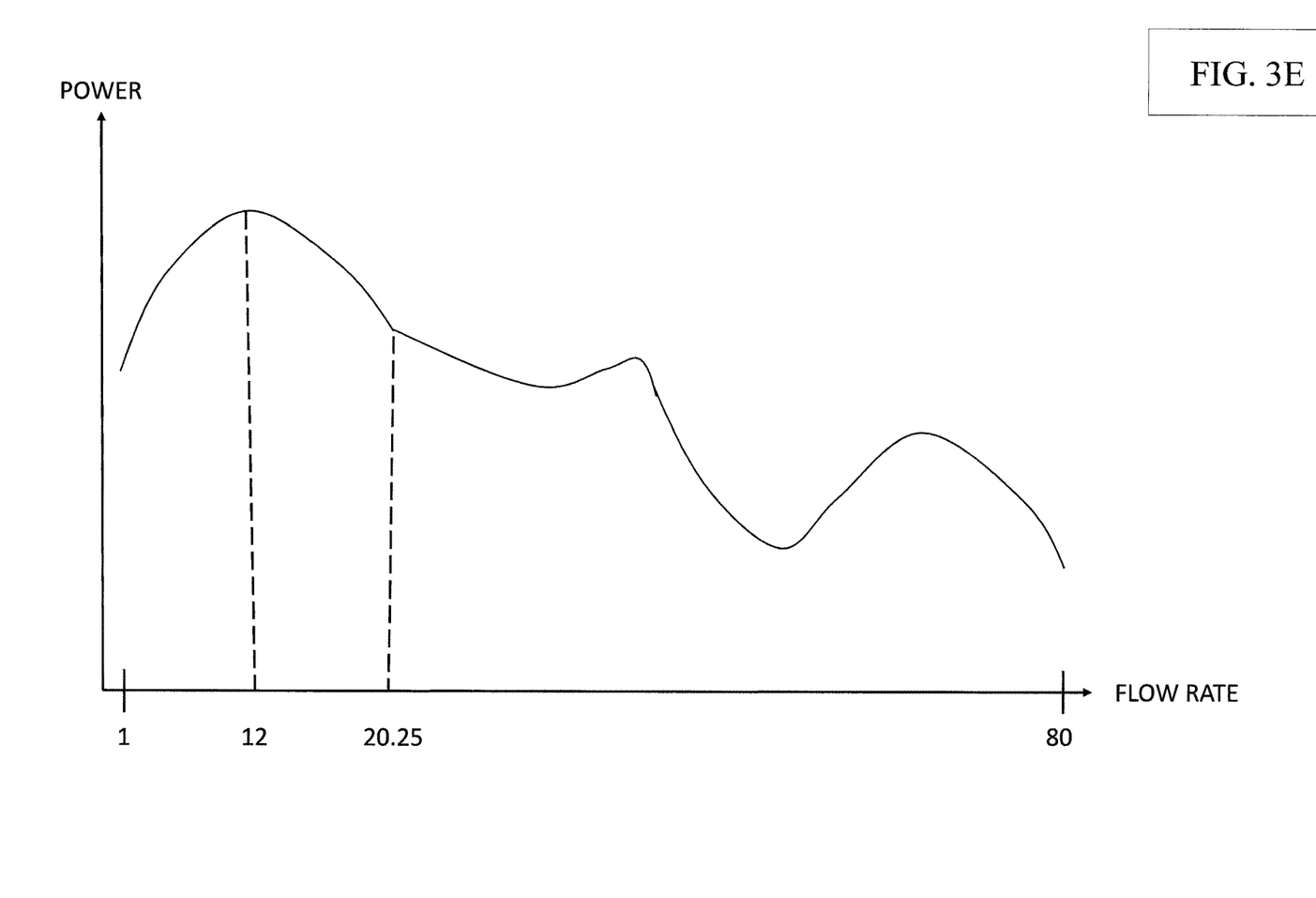
Figure 3F:
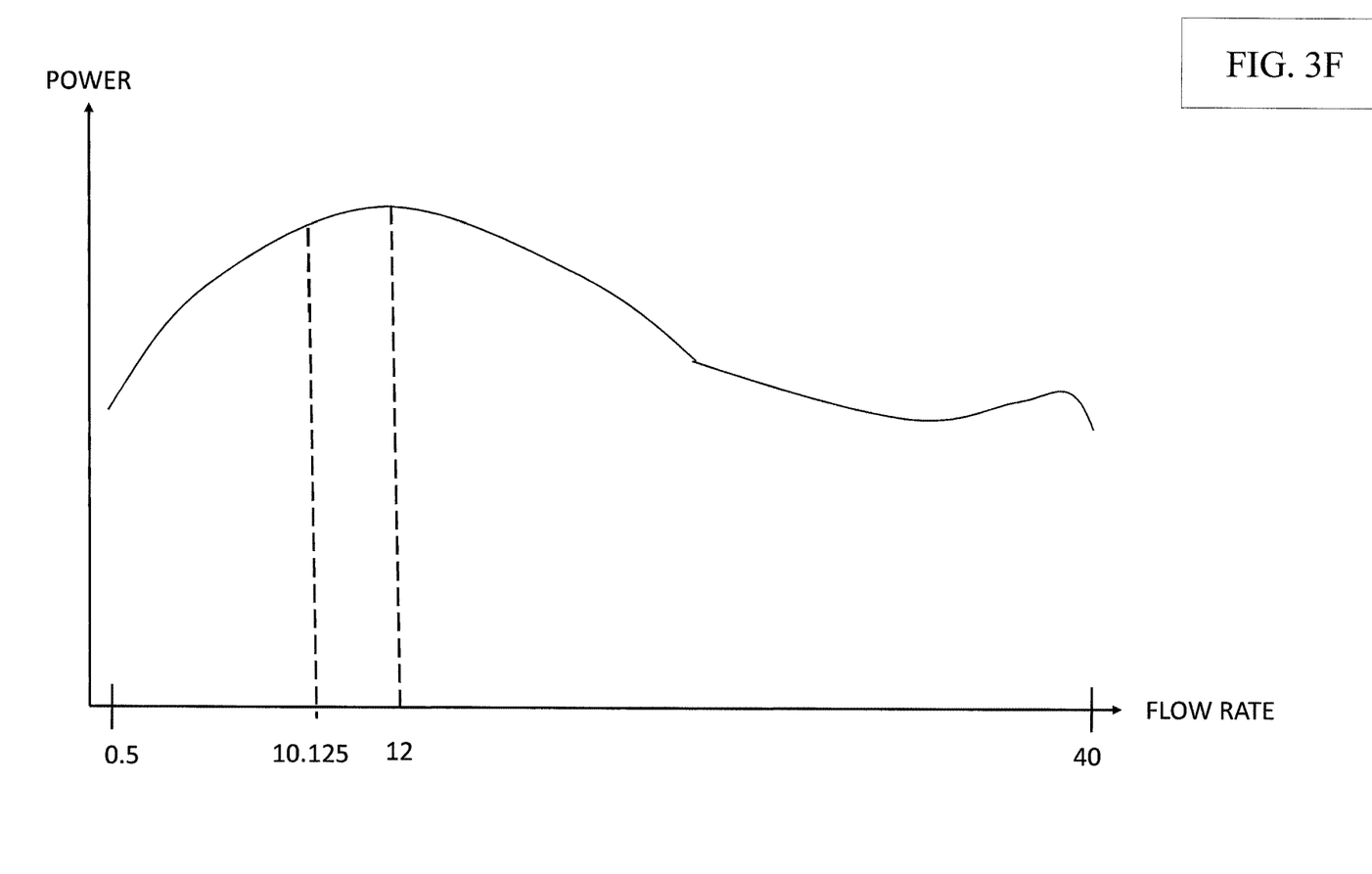

The result of the multiplications provided in relation to blocks 234''' and 238''' is shown in comparing the plots shown in FIGS. 3E and 3F. For example, the values for the range of flow rates in FIG. 3F are shown as being half of the corresponding values for the range of flow rates in FIG. 3E. The maximum value of the power (corresponding to a flow rate value of 12) is to the right of the one-quarter point value of the FRR (with a value of 10.125) in FIG. 3F.

Thus, a portion of the method 200 may serve to adjust the FRR when the flow rate corresponding to the maximum power of the plot is greater than half of the FRR or less than one-quarter of the FRR. In this manner, the FRR may be adapted based on a changing/dynamic flow rate value. Furthermore, the test/determination associated with block 262 (in conjunction with blocks 234''' and 238''') may help to ensure that low-valued flow rates (e.g., flow rates that are less than a threshold) are detected.

The method 200 is illustrative. In some embodiments, one or more blocks of the method 200, or portions thereof, may be optional. In some embodiments, the blocks may execute in an order or sequence that is different from what is shown in FIG. 2. In some embodiments, additional blocks not shown may be included.

One or more portions of the method 200 may be executed at various points in time. At least some, if not all, of the method 200 may be executed repeatedly, potentially as part of a larger program/algorithm, to obtain flow rate values at various points in time. In this respect, the signals, plots, values of power, flow rates, etc., may be distinguished from one another using terms like "first", "second", etc.

Figure 4:
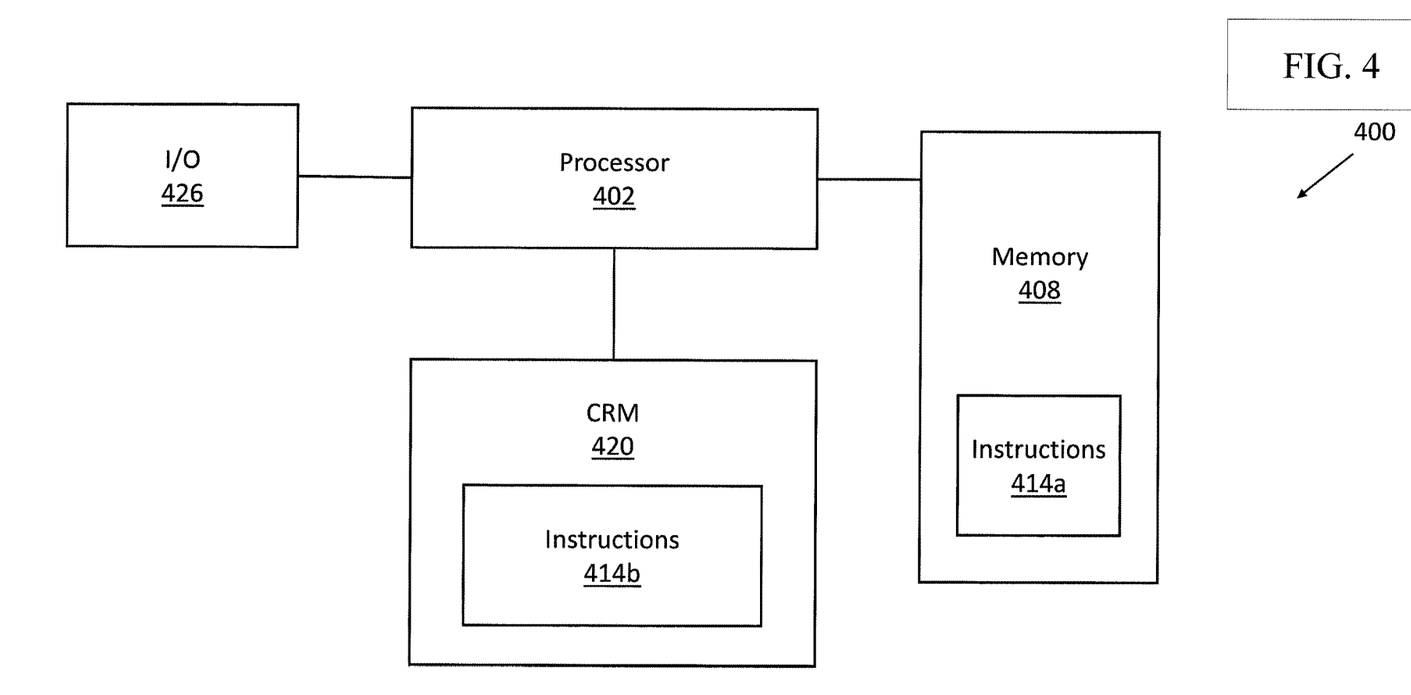
FIG. 4 illustrates a computing system of a flowmeter in accordance with aspects of this disclosure.

The method 200 may be executed by one or more computing systems. For example, FIG. 4 illustrates a computing system 400 that may include a processor 402 and a memory 408. The memory 408 may store instructions (e.g., instructions 414a) that, when executed by the processor 402, may cause the system 400 to perform the method 200. At least a portion of the instructions (e.g., instructions 414b) may be stored on a computer-readable medium (CRM) 420, such as for example a non-transitory CRM. The instructions 414b of the CRM 420 may be used as an alternative to, or in addition to, the use of the instructions 414a of the memory 408. One or both of the memory 408 and the CRM 420, taken individually or collectively, may be referred to as a storage device.

In some embodiments, the system 400 may include one or more input/output (I/O) devices 426. The I/O devices 426 may provide an interface between the system 400 and one or more other components or devices. The I/O devices 426 may include one or more of a graphical user interface (GUI), a display screen, a touchscreen, a keyboard, a mouse, a joystick, a pushbutton, a microphone, a speaker, a transceiver, etc. The I/O devices 426 may be used to output data (e.g., flow rates, plots, etc.) in one or more formats (e.g., a visual or audio rendering).

Technical effects and benefits of this disclosure include a flowmeter that is able to locate/lock-on to a flow rate of a fluid flow in a first instance and is able to adaptively adjust to a change in the flow rate thereafter. Such an ability may ensure the availability of a flow rate measurement in the first instance and may avoid a need for a technician/operator to select and enter configuration parameters for the flowmeter. Thus, a flowmeter in accordance with this disclosure will be more reliable than conventional flowmeters and will be less susceptible to technician/operator error.

The various values described herein and shown in the drawing figures are provided for the sake of illustrative convenience. Other values may be used without departing from the scope of this disclosure. The various plots may assume profiles that are different from what is shown in the drawings. While the plots are depicted in a graphical format in the drawings, other formats may be used. For example, the plots may be arranged in a tabular format in some embodiments.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method comprising:
   obtaining a first plurality of signals associated with a fluid flow in a pipe;
   processing, by a processor, the first plurality of signals to obtain a first plot of power associated with first vortices in the fluid flow and a flow rate of the fluid flow in the pipe over a first flow rate range;
   determining, by the processor, that a maximum value of the power in the first plot corresponds to a maximum value of the flow rate included in the first flow rate range or that the power is increasing as a function of the flow rate towards an end of the first plot; and
   based on said determining, multiplying, by the processor, values of the first flow rate range to obtain a second flow rate range.

2. The method of claim 1, wherein multiplying values of the first flow rate range corresponds to doubling the values of the first flow rate range to obtain the second flow rate range.

3. The method of claim 1, further comprising:
   processing, by the processor, a second plurality of signals to obtain a second plot of power associated with second vortices in the fluid flow and the flow rate of the fluid flow in the pipe over the second flow rate range.

4. The method of claim 3, further comprising:
   determining, by the processor, an actual flow rate of the fluid flow based on the second plot; and
   outputting, by an output device, the actual flow rate.

5. The method of claim 4, wherein the actual flow rate of the fluid flow corresponds to a maximum value of the power in the second plot.

6. The method of claim 1, further comprising:
   obtaining a second plurality of signals associated with the fluid flow in the pipe; and
   processing, by the processor, the second plurality of signals to obtain a second plot of power associated with second vortices in the fluid flow and a flow rate of the fluid flow in the pipe over a third flow rate range.

7. The method of claim 6, further comprising:
   determining that a minimum value included in the third flow rate range is less than a threshold; and
   based on determining that the minimum value included in the third flow rate range is less than the threshold, multiplying, by the processor, values of the third flow rate range to obtain a fourth flow rate range.

8. The method of claim 6, further comprising:
   determining, by the processor, that a maximum value of the power in the second plot corresponds to a flow rate that is greater than a fraction of the third flow rate range; and
   based on determining that the maximum value of the power in the second plot corresponds to the flow rate that is greater than the fraction of the third flow rate range, multiplying, by the processor, values of the third flow rate range to obtain a fourth flow rate range.

9. The method of claim 8, wherein the determining that the maximum value of the power in the second plot corresponds to the flow rate that is greater than the fraction of the third flow rate range includes determining that the maximum value of the power in the second plot corresponds to a flow rate that is greater than half the third flow rate range.

10. The method of claim 8, wherein multiplying values of the third flow rate range corresponds to doubling the values of the third flow rate range to obtain the fourth flow rate range.

11. The method of claim 6, further comprising:
determining, by the processor, that a maximum value of the power in the second plot corresponds to a flow rate that is less than a fraction of the third flow rate range; and
based on determining that the maximum value of the power in the second plot corresponds to the flow rate that is less than the fraction of the third flow rate range, dividing, by the processor, values of the third flow rate range to obtain a fourth flow rate range.

12. The method of claim 11, wherein the determining that the maximum value of the power in the second plot corresponds to the flow rate that is less than the fraction of the third flow rate range includes determining that the maximum value of the power in the second plot corresponds to a flow rate that is less than one-quarter of the third flow rate range.

13. The method of claim 11, wherein dividing values of the third flow rate range corresponds to halving the values of the third flow rate range to obtain the fourth flow rate range.

14. A system comprising:
a processor; and
a non-transitory storage device having instructions stored thereon that, when executed by the processor, cause the system to:
obtain a first plurality of signals associated with a fluid flow in a pipe;
process the first plurality of signals to obtain a first plot of power associated with first vortices in the fluid flow and a flow rate of the fluid flow in the pipe over a first flow rate range;
determine that a maximum value of the power in the first plot corresponds to a maximum value of the flow rate included in the first flow rate range or that the power is increasing as a function of the flow rate towards an end of the first plot;
based on said determination, multiply values of the first flow rate range to obtain a second flow rate range;
obtain a second plurality of signals associated with the fluid flow in the pipe;
process the second plurality of signals to obtain a second plot of power associated with second vortices in the fluid flow and the flow rate of the fluid flow in the pipe over the second flow rate range;
determine an actual flow rate of the fluid flow based on a maximum value of the power in the second plot; and
cause the actual flow rate to be output via an output device.

15. The system of claim 14, wherein the non-transitory storage device includes at least one of a memory or a computer-readable medium, the system further comprising:
the output device;
the pipe;
a first sensor positioned at a first axial location of the pipe; and
a second sensor positioned at a second axial location of the pipe,
wherein the first sensor provides a first of the first plurality of signals and the second sensor provides a second of the first plurality of signals.

16. The system of claim 14, wherein the instructions, when executed by the processor, cause the system to:
obtain a third plurality of signals associated with the fluid flow in the pipe;
process the third plurality of signals to obtain a third plot of power associated with third vortices in the fluid flow and the flow rate of the fluid flow in the pipe over a third flow rate range;
determine that a maximum value of the power in the third plot corresponds to a flow rate that is greater than half of the third flow rate range;
based on determining that the maximum value of the power in the third plot corresponds to the flow rate that is greater than the fraction of the third flow rate range, double values of the third flow rate range to obtain a fourth flow rate range; and
determine and output an actual flow rate based on the fourth flow rate range.

17. The system of claim 14, wherein the instructions, when executed by the processor, cause the system to:
obtain a third plurality of signals associated with the fluid flow in the pipe;
process the third plurality of signals to obtain a third plot of power associated with third vortices in the fluid flow and the flow rate of the fluid flow in the pipe over a third flow rate range;
determine that a maximum value of the power in the third plot corresponds to a flow rate that is less than a quarter of the third flow rate range;
based on determining that the maximum value of the power in the third plot corresponds to the flow rate that is less than a quarter of the third flow rate range, half values of the third flow rate range to obtain a fourth flow rate range; and
determine and output an actual flow rate based on the fourth flow rate range.

* * * * *